United States Patent
Tomita

(10) Patent No.: US 6,729,639 B2
(45) Date of Patent: May 4, 2004

(54) TOW HOOK MOUNTING STRUCTURE

(75) Inventor: Tatsuzo Tomita, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/305,780

(22) Filed: Nov. 27, 2002

(65) Prior Publication Data

US 2003/0127829 A1 Jul. 10, 2003

(30) Foreign Application Priority Data

Nov. 27, 2001 (JP) ........................ 2001-361526

(51) Int. Cl.[7] .................................................. B60D 1/14
(52) U.S. Cl. ........................ 280/495; 280/797; 280/800
(58) Field of Search ................................. 280/495, 504, 280/781, 797, 800

(56) References Cited

U.S. PATENT DOCUMENTS

| 2,093,608 | A | * | 9/1937 | Kelly | 296/191 |
|---|---|---|---|---|---|
| 3,751,064 | A | * | 8/1973 | Goodson, Jr. | 280/788 |
| 4,398,743 | A | * | 8/1983 | Belsky et al. | 280/495 |
| 6,302,426 | B1 | * | 10/2001 | Denny | 280/511 |
| 6,402,179 | B1 | * | 6/2002 | Morris et al. | 280/495 |
| 6,467,792 | B2 | * | 10/2002 | McCoy et al. | 280/495 |
| 6,502,848 | B1 | * | 1/2003 | Chou et al. | 280/500 |

FOREIGN PATENT DOCUMENTS

JP 2002-362440 * 12/2002 ........... B62D/53/00

* cited by examiner

Primary Examiner—Daniel G. DePumpo
(74) Attorney, Agent, or Firm—Rossi & Associates

(57) ABSTRACT

There is provided a hook mounting structure that comprises a vehicle body structural member having a bottom part and two side parts that extend upward from both side edges of the bottom part to be joined to a lower surface of a floor; a tow hook mounted on a lower surface of the bottom part of the vehicle body structural member; and a reinforce having a bottom part joined to the bottom part of the vehicle body structural member and two side parts joined respectively to the two side parts of the vehicle body structural member, at least one of the side parts and the bottom part of the reinforce being connected to each other via a continuous part extending diagonally therebetween.

10 Claims, 4 Drawing Sheets

TOW HOOK MOUNTING STRUCTURE

CROSS-REFERENCE TO RELATED ART

This non-provisional application incorporates by reference the subject matter of Application No. 2001-361526 filed in Japan on Nov. 27, 2001, on which a priority claim is based under 35 U.S.C. §119(a).

BACKGROUND OF THE INVENTION (1) Field of the Invention

The present invention relates to a mounting structure for a tow hook that is used to tow other vehicles or the like.

(2) Description of the Related Art

Conventionally, a variety of mounting structures for a tow hook used for towing other vehicles have been proposed and put into practical use.

For example, there is known a tow hook mounting structure in which a reinforce is stacked over the inside of a side member with a concaved cross section. This tow hook mounting structure has the problem that the bottom parts of the side member and the reinforce are deformed due to a heavy load applied to a tow hook when towing other vehicles. To prevent the deformation of the bottom parts, it may be considered that the side member and the reinforce are increased in plate thickness to improve the stiffness thereof, but this would increase the weight of a vehicle and raise the cost.

SUMMARY OF THE INVENTION

It is therefore an object of the present invention to provide an improved tow hook mounting structure.

To attain the above object, the present invention provides a tow hook mounting structure comprising: a vehicle body structural member comprising a bottom part and two side parts that extend upward from two side edges of the bottom part to be joined to a lower surface of a floor; a tow hook mounted on a lower surface of the bottom part of the vehicle body structural member; and a reinforce comprising a bottom part joined to the bottom part of the vehicle body structural member and two side parts joined respectively to the two side parts of the vehicle body structural member, at least one of the side parts and the bottom part of the reinforce being connected to each other via a continuous part extending diagonally therebetween.

With this arrangement in which the reinforce has the bottom part joined to the bottom part of the vehicle body structural member and the two side parts joined respectively to both side parts of the vehicle body structural member and at least one of the side parts and the bottom part of the reinforce are connected to each other via the continuous part extending therebetween, a load inputted from the tow hook can be transmitted to an area where the reinforce and the rear floor are welded to each other via the weld area of one of the two side parts, the continuous part, the bottom part, and the other one of the two side parts of the reinforce. This greatly improves the stiffness of the vehicle body structural member and enables the vehicle body structural member to withstand a heavy load applied to the tow hook to prevent the deformation of the bottom part.

BRIEF DESCRIPTION OF THE DRAWINGS

The nature of this invention, as well as other objects and advantages thereof, will be explained in the following with reference to the accompanying drawings, in which like reference character designate the same or similar parts throughout the figure and wherein.

DETAILED DESCRIPTION OF THE INVENTION

The present invention will now be described in detail with reference to the drawings showing a preferred embodiment thereof.

Figure 1:
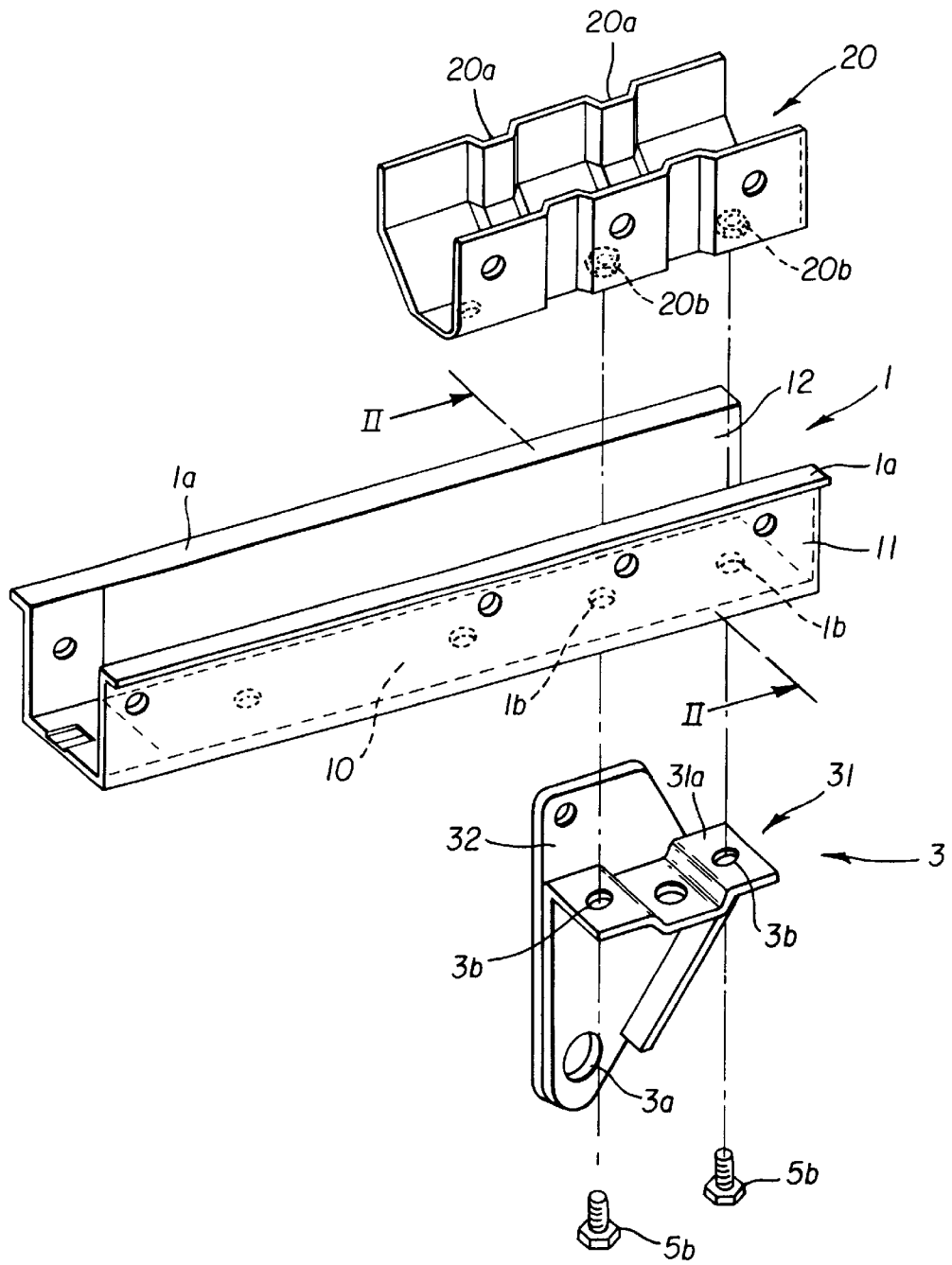
FIG. 1 is an exploded perspective view showing a tow hook mounting structure according to an embodiment of the present invention.
Figure 2:
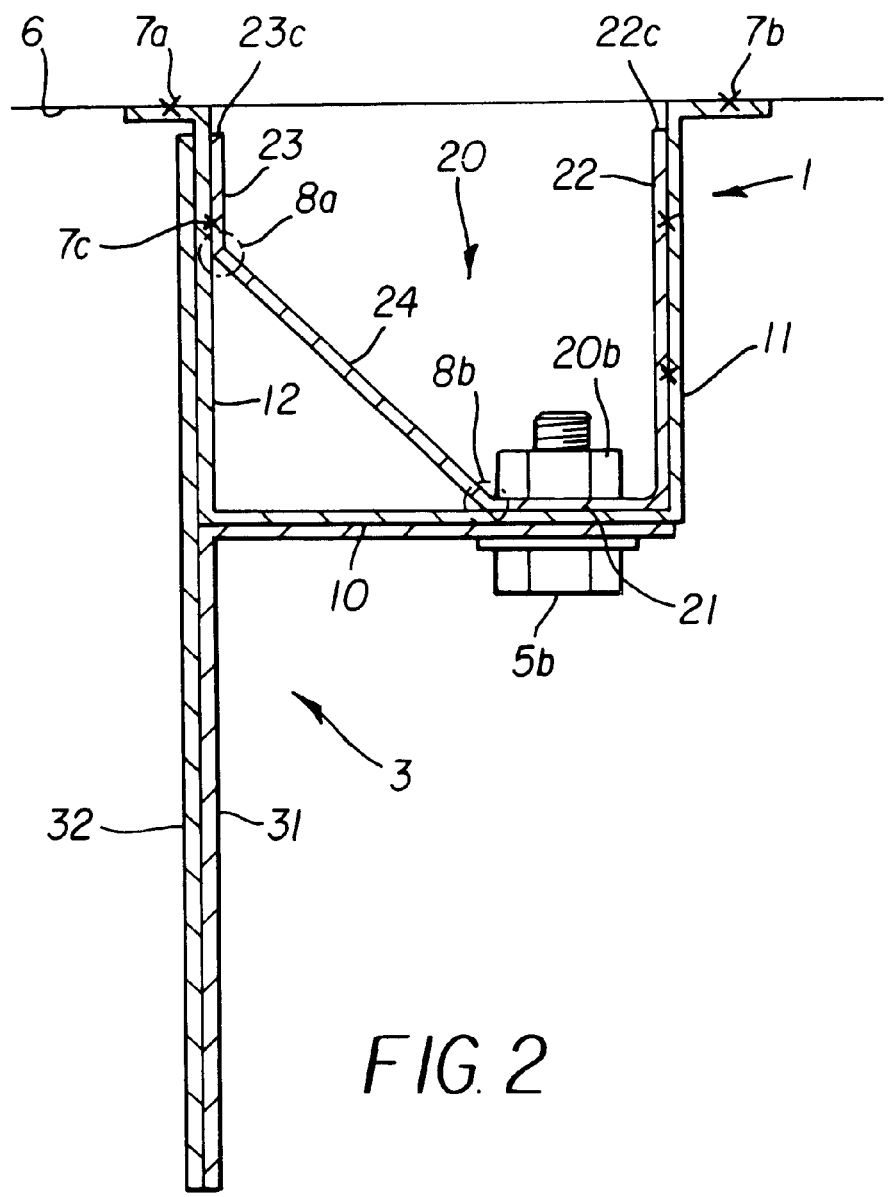
FIG. 2 is a sectional view taken on line II—II of FIG. 1.

FIGS. 1 and 2 illustrate a tow hook mounting structure according to an embodiment of the present invention, wherein FIG. 1 is an exploded perspective view and FIG. 2 is a sectional view taken on line II—II of FIG. 1.

Referring to FIG. 1, the tow hook mounting structure according to the present embodiment is comprised of a side member 1, a tow hook 3, and a reinforce 20. The side member 1 is comprised of a bottom part 10 and two side parts 11, 12 extending from both side edges of the bottom part 10. The side member 1 is formed to have a concaved cross section opening upward, and has flanges 1a thereof welded to a lower surface of a rear floor 6 of a vehicle to form a closed cross section.

Bolt holes 1b, 1b for mounting the tow hook 3 are formed in the bottom part 10 of the side member 1. The tow hook 3 is comprised of a first hook member 31 and a second hook member 32 that is mounted on a side of the first hook member 31 by welding or bolting. The first hook member 31 is comprised of a mounting surface 31a that is to be mounted on a lower surface of the side member 1, and bolt holes 3b, 3b are formed in the mounting surface 31.

A towing hole 3a for use in towing other vehicles or the like is formed in the lower part of the first hook member 31 and the second hook member 32. The second hook member 32 is intended to reinforce the first hook member 31.

Referring next to FIG. 2, a description will be given of the structure of the reinforce 20 characterizing the tow hook mounting structure according to the present invention. In FIG. 2, a mark "x" indicates a point of welding. The reinforce 20 is comprised of a bottom part 21 and side parts 22, 23 to form a closed cross section opening upward. The bottom part 21 is formed along the bottom part 10 of the side member 1, and two open edges 22c, 23c with cross sections are provided in the vicinity of weld areas 7a, 7b where the side member 1 and the rear floor 6 are welded to each other.

Weld nuts 20b, 20b used for mounting the tow hook 3 are welded to the bottom part 21. The width of the bottom part 21 of the reinforce 20 in the direction of the vehicle width is substantially the same as the width of each of the weld nuts 20b, 20b.

At one side of the bottom part 21 of the reinforce 20, one side part 22 of the reinforce 20 extends from a position in the vicinity of the weld nuts 20b, 20b (i.e. fastened parts of the tow hook 3) at a right angle to be brought into contact with the inner side of one of the side parts 11 of the side member 1. Specifically, the side part 22 from the position in the vicinity of the fastened parts of the tow hook 3 to the weld area 7b where the side member 1 and the rear floor 6 are welded to each other is formed to have a substantially linear cross section.

The other side part 23 of the reinforce 20 and the bottom part 21 of the reinforce 20 are connected to each other via a continuous part 24 that diagonally extends between the side part 23 and the bottom part 21. Specifically, the continuous part 24 and the bottom part 10 and the side part 12 of the side member 1 form a triangle. A bending part 8b between the continuous part 24 and the bottom part 21 is located in the vicinity of the weld nut 20b secured to the bottom part 21. The continuous part 24 is inclined at a predetermined angle to the bottom part 21, and it is preferred in terms of the efficiency that the continuous part 24 is inclined at an angle of 45° to the bottom part 21.

More specifically, the linear continuous part 24 inclined at a predetermined at the other side of the bottom part 21 of the reinforce 20 is formed such that a part thereof extending toward the side part 23 formed in contact with the inner side of the side part 12 of the side member 1 has a substantially linear cross section. In this way, the connecting part between the continuous part 24 and the bottom part 21 of the reinforce 20 is formed in the vicinity of the mounting part of the tow hook 3 on the bottom part 10 of the side member 1.

As shown in FIG. 1, the reinforce 20 is formed with beads 20a, 20a extending from one open edge 22c toward the other open edge 23c and projecting toward the center of the above mentioned closed cross section.

The reinforce 20 constructed as described above is welded to the bottom part 10 of the side member in such a manner that an area between the beads 20a, 20a on the bottom part 21 thereof is stacked over the concaved part of the side member 1. Specifically, the reinforce 20 is disposed inside the closed cross section formed by the side member 1 and the rear floor 6 in such a way as to extend in the longitudinal direction of the side member 1.

The tow hook mounting structure according to the embodiment of the present invention has been described above, and there will now be described the mounting procedure.

Before the side member 1 is welded to the lower surface of the rear floor 6, the reinforce 20 is stacked over the concaved part of the side member 1 to be welded to the side member 1. Bolts 5b, 5b are then engaged with the weld nuts 20b, 20b of the reinforce 20 through the bolt holes 3b, 3b, so that the tow hook 3 is fastened on the lower surface of the side member 1.

Thereafter, the flanges 1a, 1a of the side member 1 are welded to the rear floor 6. Specifically, as shown in FIG. 2, the tow hook 3 is fastened by the bolts 5b penetrating through the bottom part 10 of the side member 1 and the bottom part 21 of the reinforce 20.

In this way, in the tow hook mounting structure according to the present invention, the part of the reinforce 20 from the parts fastened by the bolts 5b b to the weld areas 7b, 7c has a substantially linear cross section. Therefore, in a case where a heavy load is applied to the tow hook 3 (i.e. in a case where a heavy load is applied to the parts fastened by the bolts 5b, 5b), the load inputted from the tow hook 3 can be transmitted to the weld area 7b via the continuous part 24 and the one side part 23 of the reinforce 20 and the bottom part 21 and the other side part 22 of the reinforce 20 because at least one side part 23 of the reinforce 20 and the bottom part 21 of the reinforce 20 are connected to each other via the continuous part 24 extending diagonally between the side part 23 and the bottom part 21. This greatly improves the stiffness of the side member 1, enables the side member 1 to withstand a heavy load applied to the tow hook 3 and prevents the deformation of the bottom part. Therefore, it is possible to eliminate the necessity of a bulkhead that has been provided conventionally.

Thus, because there is no necessity of providing the reinforce 20 with a bulkhead and increasing the plate thickness of the reinforce 20, it is possible to prevent an increase in the weight and reduce the manufacturing cost. Further, the vehicle can be easily coated because an electrocoating solution easily goes into a gap between the reinforce 20 and the side member 1 and a gap between the reinforce 20 and the rear floor 6.

Further, because the reinforce 20 is formed with the beads 20a, 20a extending in the longitudinal direction of the vehicle, the reinforce 20 is easily collapsed when a load is applied to the vehicle in the longitudinal direction to absorb an impact. Therefore, the reinforce 20 can be surely collapsed when it is crashed from behind.

Incidentally, in a case where the beads 20a, 20a are formed in the reinforce 20 by a pressing machine, the bending parts 8a, 8b in FIG. 8 bent at a wider angle than those of the conventional reinforce causes the reinforce 20 to expand to a smaller degree than in a case where the bending parts 8a, 8b are bent at a right angle. Therefore, the beads 20a, 20a can be formed with an increased depth compared with the conventional reinforce. Thus, it is possible to improve the stiffness of the area between the beads 20a, 20a and easily collapse the reinforce 20 to absorb an impact when a heavy load is applied to the vehicle from behind.

It is to be understood, however, that present invention is not limited to the above described embodiment, but various variations of the embodiment may be possible without departing from the spirits of the present invention, including variations as described below, for example.

Figure 3:
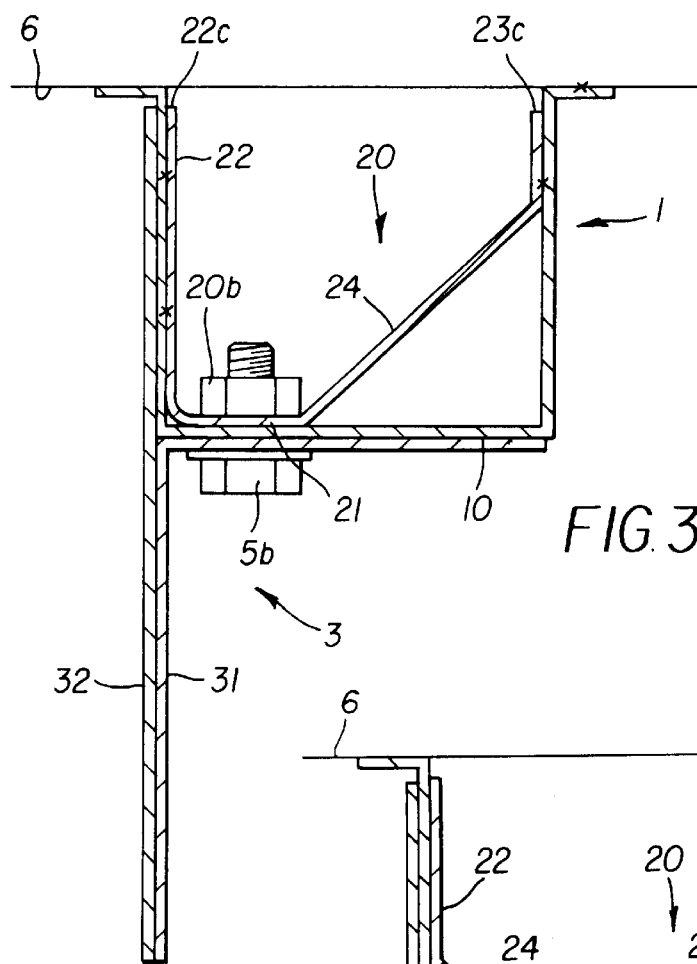
FIG. 3 is a sectional view showing a tow hook mounting structure according to a variation of the embodiment of the present invention.

Although the tow hook mounting structure according to the embodiment of the present invention is described above with reference to FIG. 2, the reinforce 20 may be mounted with its right and left sides being reversed as shown in FIG. 3.

Figure 4:
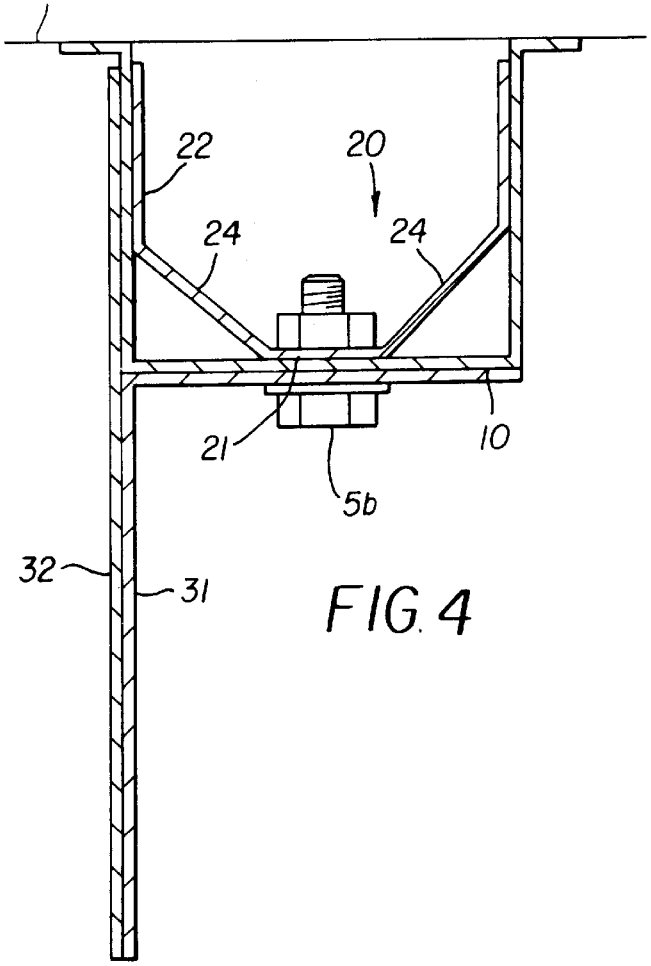
FIG. 4 is a sectional view showing a tow hook mounting structure according to another variation of the embodiment of the present invention.

Further, although in the above described embodiment, the reinforce 20 is formed with the two beads 20a, 20a, the number of beads should not be limited to two. Further, as shown in FIG. 4, the continuous part 24 may be formed at both sides of the weld nut 20b.

Figure 5:
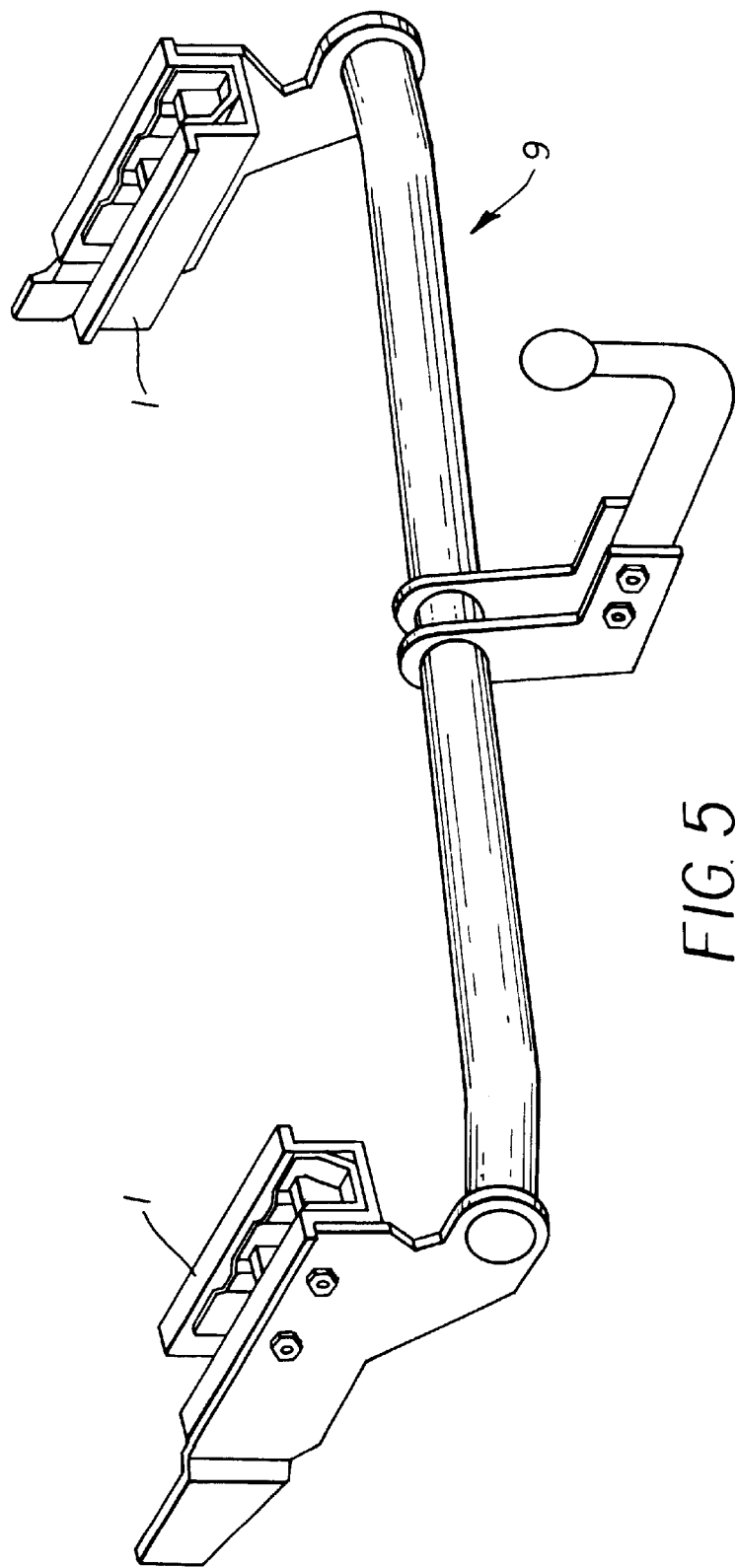
FIG. 5 is a sectional view showing a tow hook mounting structure according to still another variation of the embodiment of the present invention.

Further, as shown in FIG. 5, the reinforce 20 may be provided with a bulkhead so as to withstand a heavier load in a case where a trailer hitch member 9 is mounted on the right and left side members 1 at the rear part of the vehicle.

According to the tow hook mounting structure for the embodiment of the present invention, when a load is applied to the fastened parts from the tow hook, the load is directly transmitted via the reinforce to a position in the vicinity of the weld area where the side member and the rear floor are welded to each other. Therefore, it is possible to withstand a heavy load and prevent the deformation of the reinforce.

What is claimed is:

1. A tow hook mounting structure comprising:
   a vehicle body structural member comprising a bottom part and two side parts that extend upward from two side edges of the bottom part to be joined to a lower surface of a floor;

a tow hook mounted on a lower surface of the bottom part of said vehicle body structural member; and a reinforce comprising a bottom part joined to the bottom part of said vehicle body structural member and two side parts joined respectively to the two side parts of said vehicle body structural member, at least one of the side parts and the bottom part of said reinforce being connected to each other via a continuous part extending diagonally therebetween.

2. A tow hook mounting structure according to claim 1, wherein the continuous part and the bottom part and side parts of said vehicle body structural member form a triangle.

3. A tow hook mounting structure according to claim 1, wherein a connecting part between the continuous part and the bottom part of said reinforce is positioned in vicinity of a mounting part of said tow hook on the bottom part of said vehicle body structural member.

4. A tow hook mounting structure according to claim 1, wherein the other one of the side part of said reinforce is substantially linear.

5. A tow hook mounting structure according to claim 3, wherein said tow hook is mounted on the bottom part of said vehicle body structural member by a fastening tool penetrating through the bottom part of said vehicle body structural member and the bottom part of said reinforce.

6. A tow hook mounting structure according to claim 1, wherein said reinforce comprises at least one bead extending from one of the side parts of said vehicle body structural member toward the other one of the side parts of said vehicle body structural member and projecting inward.

7. A tow hook mounting structure according to claim 1, wherein said tow hook is mounted on a side of said vehicle body structural member by welding or bolting.

8. A tow hook mounting structure according to claim 2, wherein said continuous part is inclined at an angle of approximately 45° to the bottom part of said reinforce.

9. A tow hook mounting structure according to claim 5, wherein the width of the bottom part of said reinforce in the direction of the vehicle width is substantially the same as the width of said fasting tool.

10. A tow hook mounting structure according to claim 5, wherein said fasting tool is positioned at substantially middle of the bottom of said reinforce, and said continuous parts are formed at both side of the fasting tool in the direction of the vehicle width.

* * * * *